United States Patent
Becker et al.

(10) Patent No.: US 7,961,619 B2
(45) Date of Patent: Jun. 14, 2011

(54) PROCESS FOR OPERATION OF A DATA LINK

(76) Inventors: Thomas Becker, Berlin (DE); Frank-Michael Krause, Berlin (DE); Michael Methfessel, Frankfurt an der Oder (DE); Klaus Tittelbach-Helmrich, Frankfurt an der Oder (DE)

( * ) Notice: Subject to any disclaimer, the term of this patent is extended or adjusted under 35 U.S.C. 154(b) by 923 days.

(21) Appl. No.: 11/597,846

(22) PCT Filed: May 26, 2005

(86) PCT No.: PCT/DE2005/000975
§ 371 (c)(1),
(2), (4) Date: Aug. 7, 2007

(87) PCT Pub. No.: WO2005/117351
PCT Pub. Date: Dec. 8, 2005

(65) Prior Publication Data
US 2008/0049685 A1    Feb. 28, 2008

(30) Foreign Application Priority Data
May 27, 2004   (DE) .......................... 10 2004 026 487

(51) Int. Cl.
 *H04J 1/16*   (2006.01)
(52) U.S. Cl. ........ 370/235; 370/229; 370/338; 370/447; 370/450; 370/345
(58) Field of Classification Search .................. 370/229, 370/235, 338, 447, 450, 345
See application file for complete search history.

(56) References Cited

U.S. PATENT DOCUMENTS

| | | | |
|---|---|---|---|
| 6,332,077 B1 | 12/2001 | Wu et al. | |
| 6,980,810 B1 * | 12/2005 | Gerakoulis et al. | 455/450 |
| 6,990,116 B1 * | 1/2006 | Young et al. | 370/445 |
| 7,457,973 B2 * | 11/2008 | Liu | 713/310 |
| 2003/0148767 A1 | 8/2003 | Sugaya et al. | |
| 2004/0066783 A1 | 4/2004 | Ayyagari | |
| 2004/0068668 A1 * | 4/2004 | Lor et al. | 713/201 |
| 2005/0190731 A1 * | 9/2005 | Bejerano et al. | 370/338 |

OTHER PUBLICATIONS

Grieco, et al., "A Control Theoretic Approach for supporting Quality of Service in IEEE 802.11e WLANs with HCF [1]" Proceedings of the 42nd IEEE Conference on Decision and Control, Maui, HI, Dec. 2003, vol. 1 of 6, Conf. 42, pp. 1586-1591, XP010685880.
Shirdokar, et al., "A QoS-based Indoor Wireless Data Network Design for VoIP Applications" VTC Fall 2001, IEEE 54th, Vehicular Technology Conference Proceedings, Atlantic City, NJ, Oct. 7, 2001, vol. 1 of 4, Conf. 54, pp. 2594-2598, XP010562442.
English translation of International Preliminary Report on Patentability corresponding to PCT/DE2005/000975.

* cited by examiner

*Primary Examiner* — Kwasi Karikari
(74) *Attorney, Agent, or Firm* — Christie, Parker & Hale, LLP (57) ABSTRACT

The invention relates to a process for the operation of a data link between a base station and one or several mobile stations. According to said process data packets are transmitted between the base station and the mobile stations within transmission phases. The start of each transmission phase is indicated each time through emission of a start signal, and the transmission interface between the base station and the mobile stations for the transmission phase in question is managed by the base station. The data packets are formed with the data of a data stream and a received data stream is formed with the received data packets. The start and the end of each data packet forming operation is each time triggered by the start signals.

25 Claims, 5 Drawing Sheets

PROCESS FOR OPERATION OF A DATA LINK

CROSS-REFERENCE TO A RELATED APPLICATION

This application is a National Phase Patent Application of International Patent Application Number PCT/EP2005/000975, filed on May 26, 2005, which claims priority of German Patent Application Number 10 2004 026 487.2, filed on May 27, 2004.

BACKGROUND

A process for operation of a data link is for example known from WLAN (Wireless Local Area Network) systems. In this previously known process, a data link between a base station and one or several mobile stations is operated in that data packets are transmitted between the base station and the mobile stations within transmission phases. In WLAN systems, the transmission phases can be constituted by "contention-free" periods. The start of each transmission phase is indicated each time by the emission of a start signal, which clearly can also be described as a beacon signal; after the emission of the beacon signal, the air interface between the base station and the mobile stations for the transmission phase in question is reserved or managed by the base station. Within each transmission phase, the mobile stations are addressed by the base station and called up for the exchange of data packets. Each time after the completion of each transmission phase, there follows a trans-mission pause, in which no transmission of data packets controlled or managed by the base station takes place between the base station and the mobile stations. Since in these transmission pauses the air interface is not managed by the base station, any other devices can gain access to the air interface in these transmission pauses. Accordingly, in WLAN links, these transmission pauses are also described as "contention" periods. In WLAN networks, the sending of the beacon signals by the base station takes place at regular time intervals, for example every 10.24 msecs, so that a new transmission phase is created every 10.24 msecs.

In the previously known WLAN process, the data packets are formed with data of a data stream, in particular a speech and/or video data stream; a received data stream is then created with the received data packets. The access to the transmission medium (air interface) in the previously known WLAN process is normally effected by the CSMA/CA process (carrier sense multiple access with collision avoidance), wherein the individual mobile stations competitively access the air interface. Hence it cannot be predicted when a data packet due for transmission can actually be transmitted.

The standard IEEE802.11e (QoS extensions for WLAN) now offers the possibility of coordinating the access to the medium via the base station (access point). For this, IEEE802.11e defines a functionality "Hybrid Coordination function (HCF)", which in turn defines a coordination function for the access of the mobile stations to the transmission medium called "HCF Controlled Channel Access (HCCA)". Put simply, in the process the individual mobile stations which have applied for such a transmission mode are successively interrogated by the base station (Access Point) directly after the beacon emission and their data packets are thus collected. The time conditions for this interrogation mechanism are defined such that a mobile station cannot of itself gain control over the transmission medium.

The U.S. patent application No. 2004/0066783 A1 discloses a process for the organisation of a network with a central structure. In order to manage links with devices which operate with different transmission processes and require different transmission quality levels, for each linkage scheme an identification signal for the link type in question is also supplied. A linkage specification is assigned to each linkage type.

Compared to synchronous transmission processes (compare for example the known DECT (Digital European Cordless Telephone) process), wherein the transmission of a speech data packet always takes place at exactly the same time point relative to the frame start, with the process described at the outset and on which this invention is based the exact time of the transmission within the transmission phase is not fixed. Changes in the transmission times can for example arise through the arrival of further mobile stations or the departure of mobile stations and in some cases through repetitions of unsuccessful transmission attempts; the changes in the transmission times can sometimes considerably influence the transfer rate in the transfer of a data stream, as was found by the inventors.

A process for bandwidth assignment in IEEE802.11e WLAN networks, using a function known as a hybrid coordination function (HCF) and a hybrid coordinator (HC) for access management is known from the publication, L. A. Grieco et al., "A Control Theoretic Approach for Supporting Quality of Service in the IEEE802.11e WLANs with HCF", Proceedings of the $42^{nd}$ IEEE Conference on Decision and Control, December 2003. This publication investigates, in particular, how transmission opportunities have to be correctly distributed within a "contention-free" period, while allowing for the time requirements of traffic categories, for example for audio and video applications. The aforementioned publication discloses how an accumulation of signals in a mobile station can be processed for a number of traffic categories in the presence of interference, by allocating the bandwidth of the WLAN network in such a way that the signal accumulation of each traffic category is processed within a contention-free period.

SUMMARY

The invention is therefore based on the object of further developing a process of the type stated at the outset, in such a manner that the delay arising during the transfer of a data stream becomes as minimal as possible.

According to the invention it is provided that the start and the end of each data packet forming operation is triggered each time by the beacon signals.

A considerable advantage of the process according to the invention consists in the fact that the data streams are transmitted with minimal delay, since the data stream is packed into packets, the packet length whereof for example always corresponds to the time interval between two directly consecutive beacon signals or alternatively in some cases the time interval between two beacon signals separated by one or several further beacon signals. The data packet forming operation is thus independent of the transmission time point of the data packets within the transmission phase in question. Hence, at the receiving end, direct assembly of the data packets is possible, without having to take account of their transfer period. Errors and consequent delays in the assembly of the data packets received, which can arise with data packet formation that is "variable" with time or undefined, are thus avoided.

The process is preferably carried out with real-time critical data streams, especially for example with audio or video data streams.

Preferably, each transmission phase is followed each time by a transmission pause, in which no data packet transfer for useful data transmission takes place.

Preferably the data packets are transmitted between the base station and the mobile station each time in that transmission phase whose beacon signal also triggers the end of the data packet forming operation in question. Thus, in other words, in this mode of operation, the speech data packets are formed in such a manner that the most recent data of the data stream on the sender side (base station or mobile station) is always assembled into a data packet at the beginning of the beacon emission and then sent.

Preferably the data packets received each time are temporarily stored until the end of a predefined storage period after the occurrence of the beacon signal triggering the transmission phase in question, before the received data stream is formed with the received data packets. In this way, the occurrence of a time jitter in the formation of the received data stream is reduced. The predefined storage period preferably depends on the time period between two consecutive beacon signals. For example the predefined storage period is half the time period between two consecutive beacon signals. In the latter case, the length of the transmission phases should preferably always be smaller than, or at the maximum as large as, half the time period between two consecutive beacon signals, in order to ensure undistorted received data stream formation.

Alternatively, the received data packets can be temporarily stored until the end of the transmission phase in question (U), before the received data stream is formed with the received data packets.

Preferably, the data packets received, i.e. at the receiving end, are temporarily stored until the end of the transmission phase in question, before the received data stream is formed or "continued" with the data packet received each time. This mode of operation ensures that all the data of a data packet needed for formation of the received data stream are always transmitted: a lack of data from a data packet and consequent defective received data stream formation are thus avoided.

Particularly preferably, the duration of the transmission phases each time is at most half of the time interval between two consecutive beacon signals. In this way, the maximal delay that can arise in the formation of the received data stream is limited.

In an advantageous form of the process according to the invention, the aim is for the mobile stations to be able to effect seamless handover procedures to other base stations. Here a handover procedure is understood to mean that a mobile station changes its base station, i.e. switches from the original base station to another base station, for example because the transmission quality (e.g. signal strength, signal to noise ratio, bit error rate, etc.) in relation to the original base station has deteriorated. During the handover procedures, the transmission quality should not, or at least not significantly, be impaired, so that for the users of the link, for example for the telephone users in the case of a telephone link, the handover procedure is as far as possible imperceptible. In the context of the advantageous form of the process, this is achieved in that each time after data packet transmission has been effected each mobile station is omitted from the data packet transmission for at least one following transmission phase; as soon as the mobile stations wish to prepare for a handover procedure, they switch into a monitoring phase outside the transmission phases used for the data packet transmission with the base station. In this monitoring phase, the radio traffic, in particular at other frequencies than the transmission frequency of the assigned base station, is listened to, and another (new) base station suitable for the data package transmission is sought. An advantage of this form of the process consists in that, during this, time windows are deliberately created for the mobile stations, wherein the mobile stations can prepare for a handover procedure if required. This is achieved through the fact that each mobile station does not have to transmit data packets in every one of the transmission phases "made available" by the base station, but instead of this is regularly "released" for at least one transmission phase. Through the deliberate omission of transmission phases, a free time space is created, in which the mobile stations can monitor the radio traffic at other frequencies and can seek other base stations better suited for the data transmission. The described advantageous form of the process is for example to be recommended with all real-time critical data streams, in particular for example with audio (e.g. audio data formed in accordance with the "DECT" standard) or video data streams which are transmitted via WLAN, since a quasi interruption-free handover procedure is enabled.

It is considered advantageous for the mobile stations, in the event of the availability of another suitable base station, to set up a parallel link with the other base station for the preparation of the handover procedure, during which time windows which lie outside the transmission phases used for the data packet transfer with the original base station are used for the parallel link. Through the formation of an interim parallel link, it is ensured that a loss of data packets during the handover procedure is avoided.

In the case of parallel data packet transfer, it is considered advantageous for the mobile stations to create the data packets for the original base station at the instigation of the beacon signals of the original base station and the data packets for the other (new) base station at the instigation of the beacon signals of the other (new) base station. In this way, a best possible synchrony of the data streams at the changeover location in question, and hence a "seamless handover" in the changeover, are achieved. Asynchronies, which arise due to mutually divergent time-bases in the base stations involved (time mismatch between the beacon signals of the base stations), during the brief duration of a handover procedure cause only a small synchrony mismatch of the data streams of a few sample values at the changeover location in question, which is imperceptible, or only just perceptible.

Preferably the two base stations operate with different transmission frequencies. The beacon signals of the two base stations can be mutually asynchronous. Preferably, the beacon signals of both base stations are made equidistant each time.

The process can for example be carried out according to the WLAN standard described at the outset; the base stations are accordingly each constituted by WLAN access points (AP'S). After the emission of the beacon signals, the air interface for the frequency range in question is thus reserved each time with the creation of a "contention-free" period; between the transmission phases, the air interface in the frequency range in question is released for "contention" periods. The end of each transmission phase can for example be indicated each time by the emission of a "contention-free end signal" by the base station.

It is considered advantageous for the omission or the use of the transmission phases to take place continuously such that each mobile station performs a data packet transmission exclusively in every m-th transmission phase, where "m" denotes a whole number greater than 1.

It is especially advantageous if each mobile station performs a data packet transmission in every second transmission phase. In this latter case, the data packets preferably have a data content whose duration or data content corresponds to the data stream content during double the time interval between two beacon signals; it thus remains ensured that the data stream is transmitted without data loss.

The time windows used for the parallel link preferably include those transmission phases of the original base station which are "omitted" in relation to this base station.

After the link has been created with the other base station, the parallel link with the original base station is preferably ended, in order to take the load off the air interface.

If several mobile stations are connected to the base station, it is considered advantageous for the assignment of the mobile stations to the transmission phases which are used for the data packet transmission with the base station in question to be effected evenly. For example, half of the mobile stations are enlisted for data packet transmission in all "odd" (first, third, fifth, etc.) transmission phases, and the other half of the mobile stations in all "even" (second, fourth, sixth, etc.) transmission phases. Accordingly, each time the data packets should be "bundled" or formed such that, in spite of the use of only every second transmission phase, at the receiving end an uninterrupted, data loss-free received data stream can be created; hence if only every second transmission phase is used, then the data packets must be twice as large or contain twice as much useful data as would be necessary with a data packet transmission in every transmission phase.

Preferably, the time interval between two consecutive beacon signals is selected to be at least twice as large as the length of the contention-free periods lying between them each time, if every "second" transmission phase is omitted by the mobile stations each time. In this case, the duration of the monitoring phase of the mobile stations is preferably at least 1.5 times the time interval between two consecutive beacon signals.

The time interval between two beacon signals can for example be between 5 msecs and 15 msecs; with WLAN links an interval of 10.24 msecs is for example selected. The beacon interval is thus relatively short in relation to an audio link (as a rule an 8 kHz link).

The invention further relates to a base station for the operation of a data link with one or several mobile stations.

With respect to such a base station, the invention is based on the object of making it possible for the delay arising in the transfer of the data stream to be as minimal as possible.

This object is achieved according to the invention by means of a base station with a base station control device, which exchanges data packets with the mobile stations within predefined transmission phases. The base station control device each time indicates the start of each transmission phase by emission of a beacon signal and reserves the air interface for the transmission phase in question. In addition, with the data of a data stream, in particular of a speech and/or video data stream, it forms data packets, during which the start and the end of each data packet forming operation each time is triggered by the beacon signals. Next the data packets are transmitted to the assigned mobile station.

It is considered advantageous for the base station control device also to assign the transmission phases to the mobile stations in such a manner that each time after data packet transmission has been effected, each mobile station remains excluded from the data packet transmission for at least one subsequent transmission phase.

With regard to the advantages of the base station according to the invention and with regard to further advantageous forms of the base station according to the invention, reference is made to the above explanations in connection with the process according to the invention.

The invention further relates to a mobile station for the operation of a data link with a base station.

With respect to such a mobile station, the invention is based on the object of making it possible for the delay arising in the transfer of the data stream to be as minimal as possible.

This object is achieved according to the invention by means of a mobile station with a mobile station control device, which exchanges data packets with the base station within predefined transmission phases, forms data packets with the data of a data stream, in particular of a speech and/or video data stream, during which the start and the end of each data packet forming operation each time is triggered by the beacon signals, and transmits the data packets to base station.

It is considered advantageous for the base station control device also to omit at least one subsequent transmission phase for data packet transmission each time after data packet transmission has been effected.

With regard to the advantages of the mobile station according to the invention and with regard to further advantageous forms of the mobile station according to the invention, reference is made to the above explanations in connection with the process according to the invention.

BRIEF DESCRIPTION OF THE DRAWINGS

The invention is further explained with reference to the figures.

DETAILED DESCRIPTION

Figure 1:
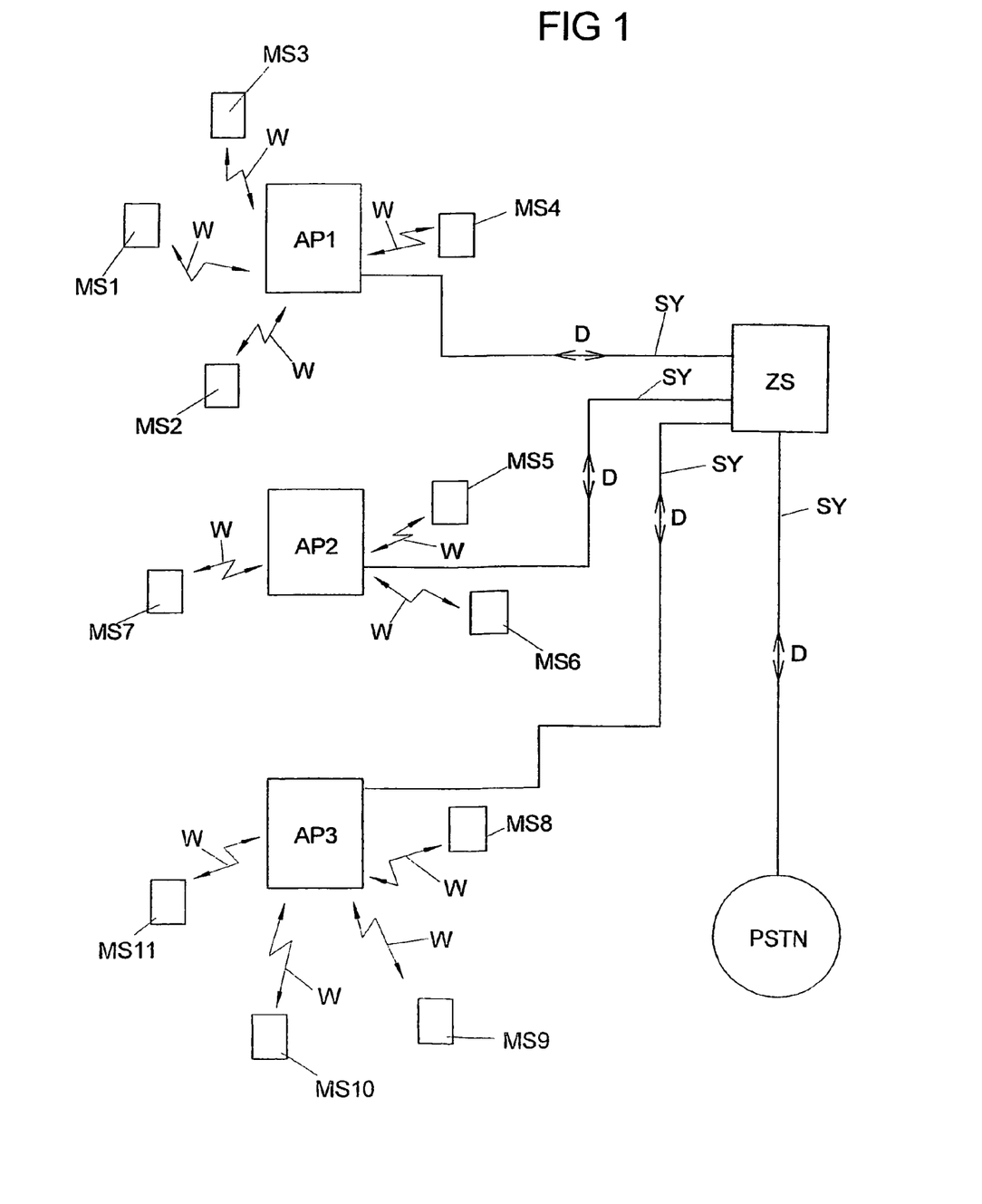
FIG. 1 shows a network with eleven mobile stations according to the invention and three base stations according to the invention, and the process according to the invention is illustrated on the basis of the network.

In FIG. 1, four mobile stations MS1 to MS4 are seen, which are in a WLAN radio link W with an access point AP1. Correspondingly, three mobile stations MS5 to MS7 are in a WLAN radio link W with an access point AP2, and four mobile stations MS8 to MS11 with an access point AP3.

The WLAN radio links W can for example be effected in accordance with the standard IEEE 802.11a, b or g with HCF-QoS extensions in accordance with IEEE 802.11e. The radio transmission takes place for example in the MHz or GHz range.

The three access points AP1, AP2 and AP3 are each connected to a central switch ZS (switching device), which is connected to a public telephone network PSTN and/or to the internet. The links between the central switch ZS and the access points AP1, AP2 and AP3 on the one hand and the link between the central switch ZS and the public telephone network on the other are each for example constituted by a synchronous interface SY (e.g. ISDN-SO or UpO interface) or a packet-oriented interface with appropriate QoS precautions. Data streams D for example in the kHz range (e.g. telephone link) are transmitted via these interfaces SY.

In order to achieve as small time delays and as slight a jitter as possible in the conversion of the data streams D into radio signals for the WLAN link path W, the data packets for the WLAN link path W are created with "beacon-triggering" both in the access points AP1 to AP3 and also in the mobile stations MS1 to MS11. During this, the data stream D is subdivided into packets, the packet content whereof always corresponds to the data content in one time window, the time window duration whereof is equal to double the time interval between two directly consecutive beacon signals. Transmission of the data packets between the access points AP1 to AP3 and the respective assigned mobile stations MS1 to MS11 therefore takes place each time only in every second transmission phase; every second transmission phase is thus omitted.

If for example the signal quality in the data link between the mobile station MS2 and the access point AP1 decreases, then the mobile station MS2 must seek another access point with better transmission quality and create a link with this. Since different frequencies are assigned to different access points, the mobile station MS2 must retune on a trial basis to another frequency, wait for a beacon on this frequency and, if one is found, record the associated signal quality, for example the signal strength. By repetition of this "scan procedure" at different frequencies, a table of possible access points is built up, in order then to seek the optimal access point as the target of the handover.

A problem now is that the access points AP1 to AP3, in contrast for example to DECT base stations, are not mutually synchronised. The beacons (short for beacon signals) of the different access points are thus in any time position relative to one another, although they each display the same beacon repeat rate or the same beacon interval BA (see FIG. 2). For example, the transmission phases of the access points AP1 to AP3 may overlap.

Since the mobile station MS2 cannot know the time shift of the beacon signals, it must, with a beacon signal interval of for example 10.24 msecs, listen at the new frequency in question for at least ca. 10 msecs in order to intercept a possible beacon signal. This could lead to an interruption in the data stream, since in the period in which the mobile station MS2 is tuned to another frequency no data can be transmitted to the old, original access point AP1.

In order to prevent such an interruption of the data stream, each access point AP1 to AP3 divides the transmission phases in such a manner that each assigned mobile station omits at least one transmission phase each time after each utilised transmission phase. For example, each mobile station sends and receives data packets only in every second period.

Figure 2:
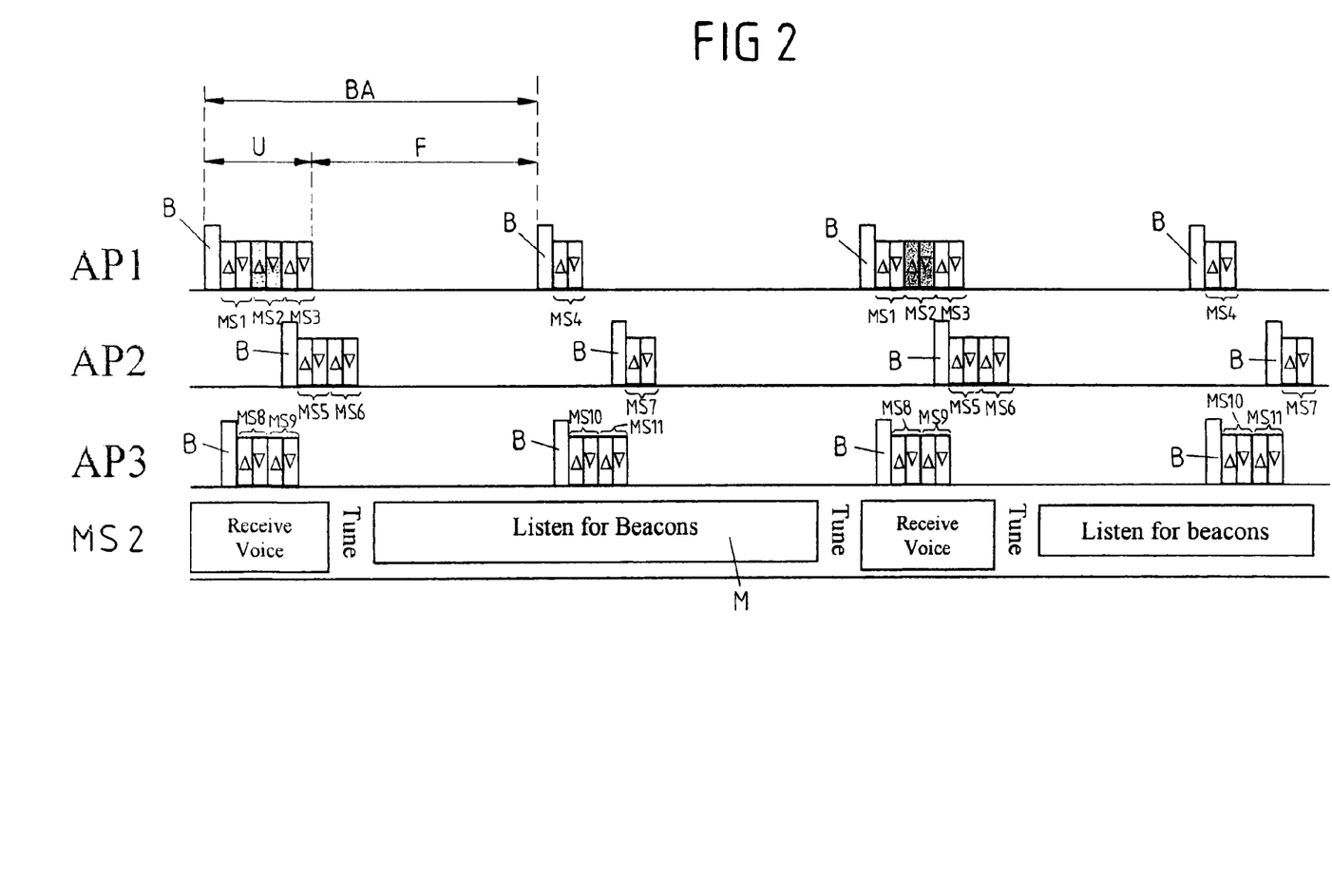
FIG. 2 shows the course of transmission before a handover procedure.

This is shown by way of example in FIG. 2, in which the time sequence of the data packet transmission between the access points AP1 to AP3 and the mobile stations MS1 to MS11 is shown. In each case, a "A" symbol represents a transmission in the mobile station direction and the symbol rotated through 180° a transmission in the access point direction. The beacon signals are marked with the symbol B and have a beacon interval BA of for example 10.24 msecs.

The transmission phase, or "contention-free period", triggered by the beacon signal B is marked in FIG. 2 by the symbol U. Each transmission phase U is followed each time by a transmission pause ("contention period") F, in which the air path is released for the frequency range in question.

Since each mobile station MS1 to MS13 [sic] each uses only every second transmission phase, the quantity of data per transmission phase each time is doubled, compared to a "normal" transmission in every transmission phase, in order to obtain the required mean data rate.

As can be seen in FIG. 2, the mobile stations assigned to each access point are preferably evenly apportioned to the "even" and "odd" beacons or transmission phases, in order to attain an even loading of the transmission phases.

Since only every second transmission phase relative to the access point AP1 is used, the mobile station MS2 has sufficient time between the data transmissions to the assigned access point AP1 to retune to another frequency, to seek a beacon there, and tune back to the old frequency in good time. The central point is that the beacon period is still always 10.24 msecs, although the interval between the transmission phases actually used is doubled, compared to the "normal" use of all transmission phases.

Preferably, in each case the time interval between two consecutive beacon signals, here 10.24 msecs, is at least twice as large as the length of the contention-free period U lying between them; this means that the transmission phases may last a maximum of 5.12 msecs each time. Correspondingly, the duration of the monitoring phase M of the mobile station MS2 can be 1.5 times the time interval between two consecutive beacon signals, i.e. ca. 15 msecs. Accordingly, in this monitoring phase of 15 msecs at least one beacon on the new frequency must be recognisable, irrespective of how the beacons of the three unsynchronised access points AP1 to AP3 are displaced relative to one another, because the beacon interval at all access points is 10.24 msecs in each case.

If, as already mentioned above in connection with FIG. 1, for example the signal quality in the data link between the mobile station MS2 and the access point AP1 decreases, then the mobile station MS2 scans the air interface at different frequencies for available access points. If for example in the process it is established that the access point AP2 is suitable for a handover procedure, then the mobile station MS2 will create a parallel data link with the new access point AP2. This is shown in detail in FIG. 3.

Figure 3:
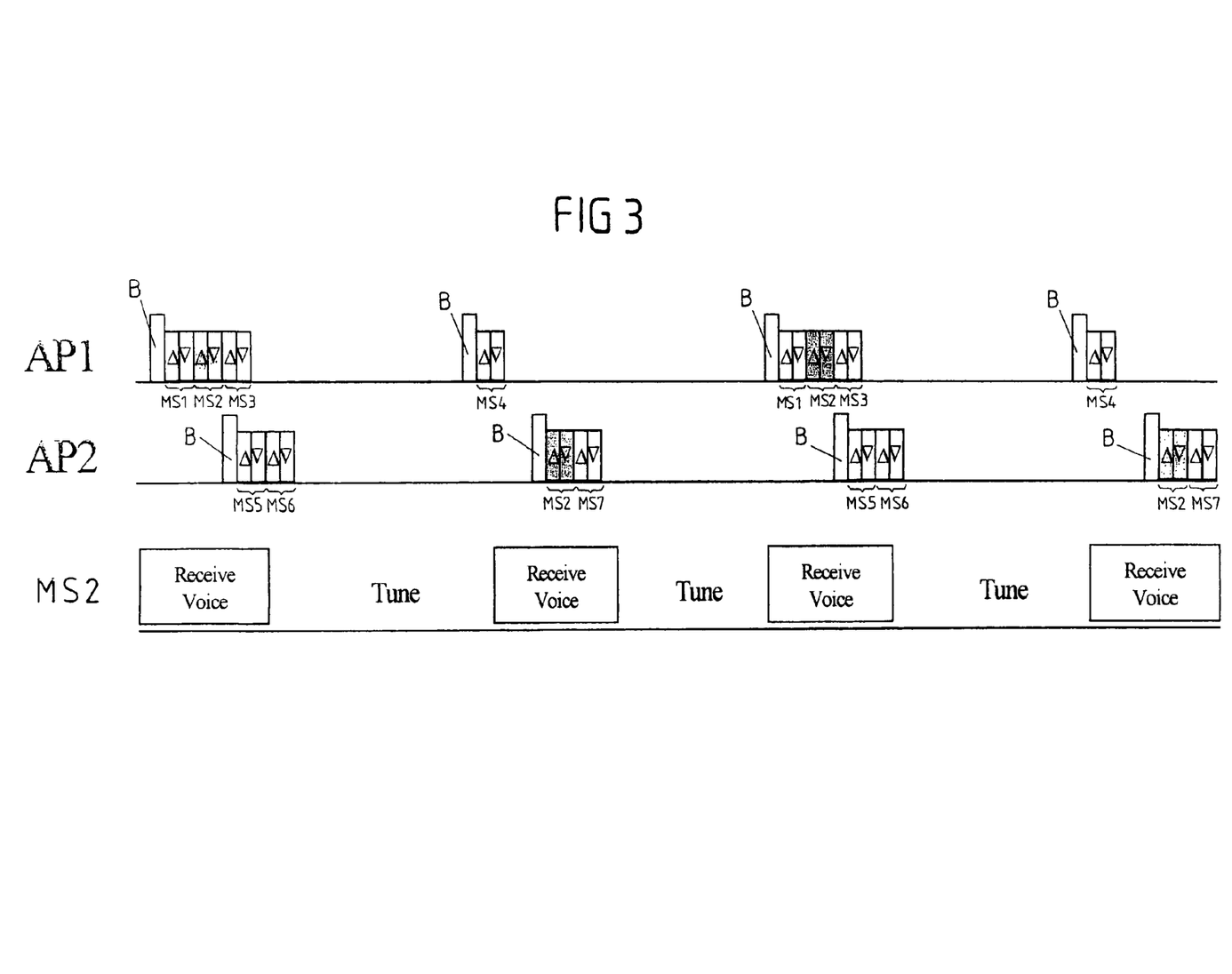
FIG. 3 shows the course of transmission during the handover procedure.

As can be seen in FIG. 3, the assignment to the "even" or "odd" beacon at the new frequency of the new access point AP2 is selected in such a manner that in fact two parallel data streams are possible; this means for example that the mobile station MS2 must select an "odd" transmission phase in relation to the new access point AP2, if it is in an "even" transmission phase in relation to the old, original access point AP1. In the handover phase, the mobile station MS2 on average transmits data every 10.24 msecs, which is alternately directed to the old and the new access point.

Figure 4:
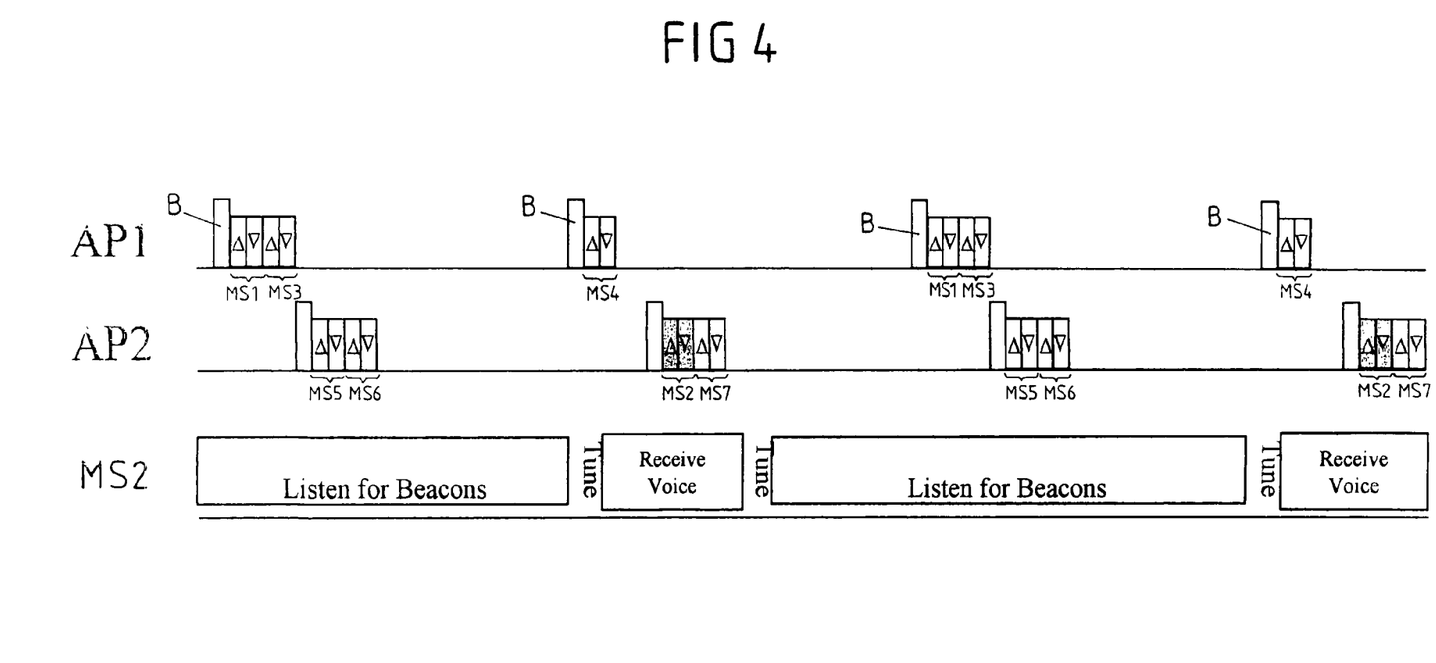
FIG. 4 shows the course of transmission after the handover procedure.

As soon as the creation of the parallel data link is completed, the link to the original access point AP1 is broken off; this is shown in FIG. 4.

Figure 5:
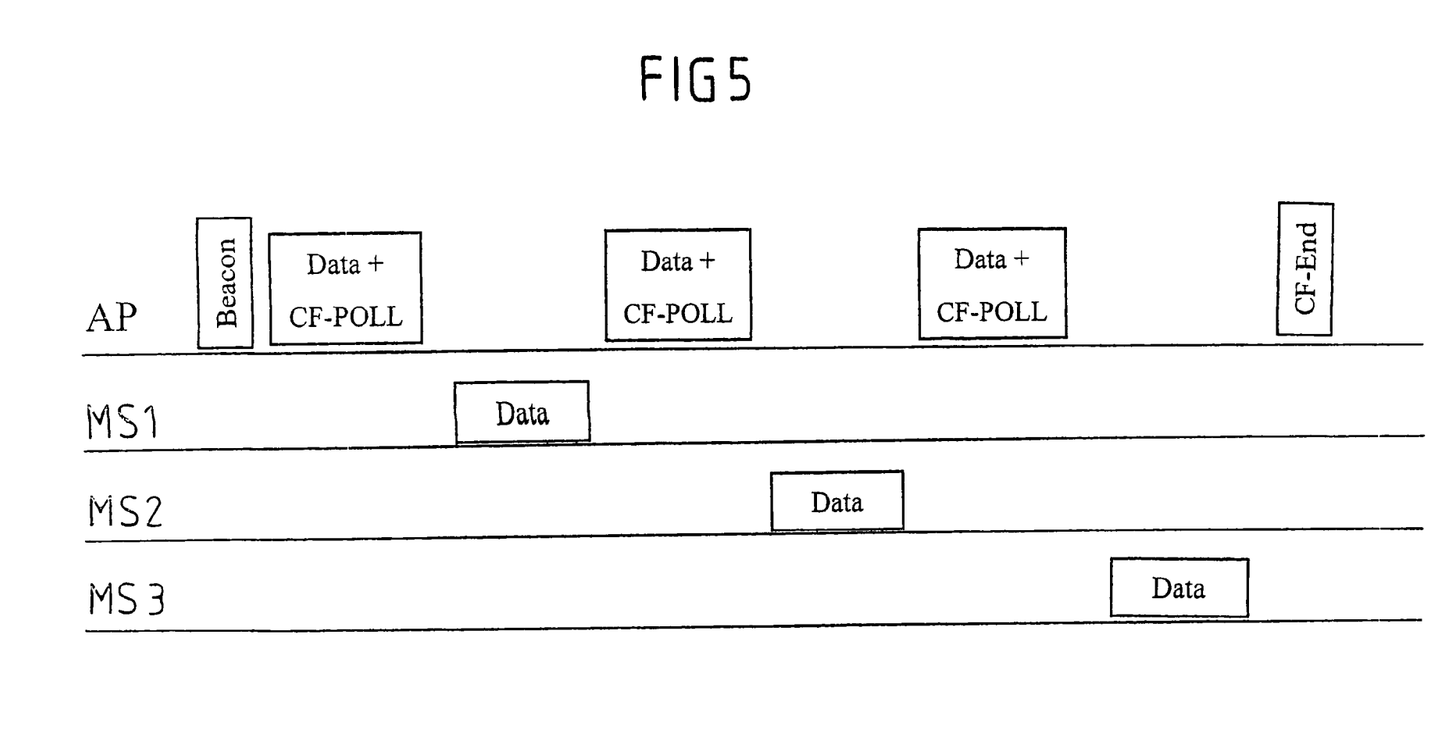
FIG. 5 shows a transmission procedure in detail.

For better understanding, in FIG. 5 the data link between the access point AP1 and the three mobile stations MS1 to MS3 in the "first" transmission phase according to FIG. 2 is shown once again. It can be seen that the access point AP1 firstly passes data packets "DATA" to the mobile station MS1. As soon as this process is completed, data packets "DATA" are requested from the mobile station MS1 by means of a signal CF-Poll. Next, this process of the sending and "requesting" of data packets is repeated with the mobile stations MS2 and MS3. The "contention-free periods" can for example be ended by a contention-free end signal CF-end.

The data packets "DATA" always contain a data content which corresponds in time to double the time interval BA between two directly consecutive beacons signals. The data packets "DATA" thus contain data of the data stream D for a time period of 2*BA.

The invention claimed is:
1. A method for operating a data link between a base station and one or more mobile stations, the method comprising:
   transmitting data packets between the base station and the
      one or more mobile stations within transmission phases;

generating a start signal to indicate start of each transmission phase;
managing a transmission interface between the base station and the one or more mobile stations for a respective transmission phase by the base station, responsive to the start signal;
transmitting data packets formed with data of a data stream to the one or more mobile stations;
receiving the data packets by the one or more mobile stations; and
forming a received data stream with the received data packets, wherein start and end of each data packet are triggered by a respective start signal; and wherein the received data packets are temporarily stored until the end of the transmission phase, and before the received data stream is formed with the received data packets.

2. A method for operating a data link between a base station and one or more mobile stations, the method comprising:
transmitting data packets between the base station and the one or more mobile stations within transmission phases;
generating a start signal to indicate start of each transmission phase;
managing a transmission interface between the base station and the one or more mobile stations for a respective transmission phase by the base station, responsive to the start signal; transmitting data packets formed with data of a data stream to the one or more mobile stations;
receiving the data packets by the one or more mobile stations; and
forming a received data stream with the received data packets, wherein start and end of each data packet are triggered by a respective start signal, wherein
the start signal is a beacon signal, and
wherein the received data packets are temporarily stored until the end of a predefined storage period after the occurrence of the beacon signal triggering the transmission phase, and before the received data stream is formed with the received data packets.

3. The method according to claim 2, wherein the predefined storage period depends on the time period between two consecutive beacon signals.

4. The method according to claim 3, wherein the predefined storage period corresponds to half of the time period between two consecutive beacon signals.

5. The method according to claim 2, wherein the data packets are formed with real-time critical data streams, and are transmitted in the course of data packet transmission.

6. The method according to claim 2, wherein the data packets are formed with real-time critical audio or video data streams and are transmitted in the course of data packet transmission.

7. The method according to claim 2, wherein the data packets have a data content duration of which corresponds to an integer multiple of the time interval between two beacon signals.

8. The method according to claim 2, wherein start of a contention-free period is indicated by the beacon signals.

9. The method according to claim 2, wherein the transmission interface is configured as a wireless interface, and wherein between the transmission phases the wireless interface in a respective frequency range is released for contention periods.

10. The method according to claim 2, wherein the data packet transmission takes place in a Wireless Local Area Network (WLAN) standard and the base station is constituted by a WLAN access point.

11. The method according to claim 2, wherein a range of the time interval between two beacon signals is between 5 msecs and 15 msecs.

12. The method according to claim 2, wherein each time after data packet transmission has been effected each mobile station is omitted from the data packet transmission for at least one subsequent transmission phase.

13. The method according to claim 12, wherein each mobile station is authorised for the data packet transmission exclusively in every m-th transmission phase, where m denotes an integer number greater than one.

14. The method according to claim 12, wherein each mobile station is authorised for the data packet transmission exclusively in every second transmission phase.

15. The method according to claim 2, wherein outside the transmission phases used for the data packet transmission with the base station, the mobile stations switch into a monitoring phase, wherein radio traffic is listened to.

16. The method according to claim 15, wherein in the monitoring phases, another base station suitable for the data packet transmission is sought.

17. The method according to claim 16, wherein in the event of availability of a suitable other base station, the mobile stations set up a parallel link with the other base station, and wherein time windows which lie outside the transmission phases used for the data packet transfer with the base station are used for the parallel link.

18. The method according to claim 17, wherein the two base stations operate with different transmission frequencies and the beacon signals of both base stations are mutually asynchronous.

19. The method according to claim 17, wherein the beacon signals of the two base stations are made equidistant each time.

20. The method according to claim 17, wherein the mobile stations create the data packets for the base station at the instigation of the beacon signals of the base station and the data packets for the suitable other base station at the instigation of the beacon signals of the suitable other base station.

21. The method according to claim 17, wherein the time windows used for the parallel link include the transmission phases omitted in relation to the base station.

22. The method according to claim 17, wherein after link creation with the suitable other base station has been effected, the parallel link with the base station is ended.

23. The method according to claim 2, wherein the assignment of the mobile stations to the transmission phases which are used for the data packet transmission with the base station is effected evenly.

24. The method according to claim 2, wherein the time interval between two consecutive start signals is selected to be at least twice as large as the length of the contention-free periods lying between the two consecutive start signals.

25. The method according to claim 2, wherein the duration of the monitoring phase of the mobile stations is at least 1.5 times the time interval between two consecutive start signals.

* * * * *